Figure 1:
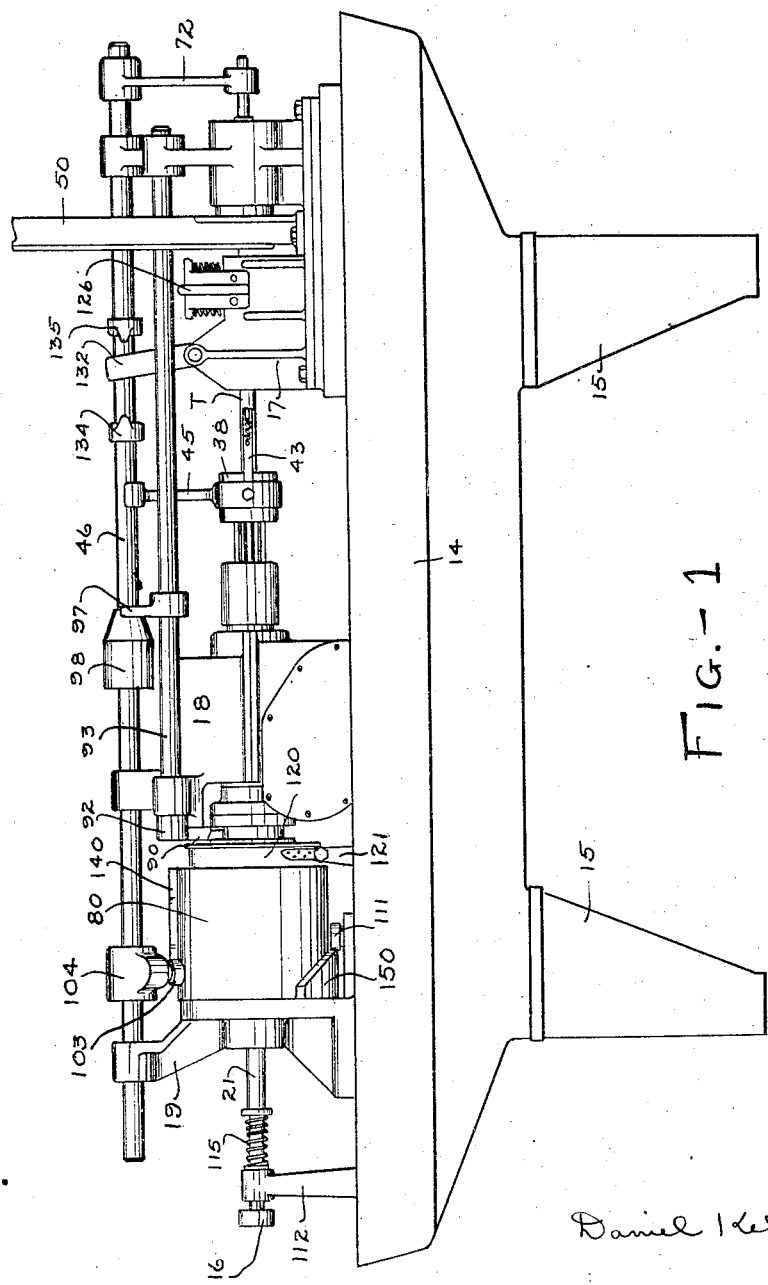

Oct. 11, 1927.

D. KELLEHER 1,645,285

CONDUIT THREADING MACHINE

Filed Aug. 23, 1926    8 Sheets-Sheet 3

Inventor

Daniel Kelleher

By Bates, Macklin, Gabriel & Pease

Attorneys

Oct. 11, 1927.

D. KELLEHER 1,645,285

CONDUIT THREADING MACHINE

Filed Aug. 23, 1926

8 Sheets-Sheet 4

Inventor
Daniel Kelleher

By Bates Macklin Bolnick & Peare
Attorneys

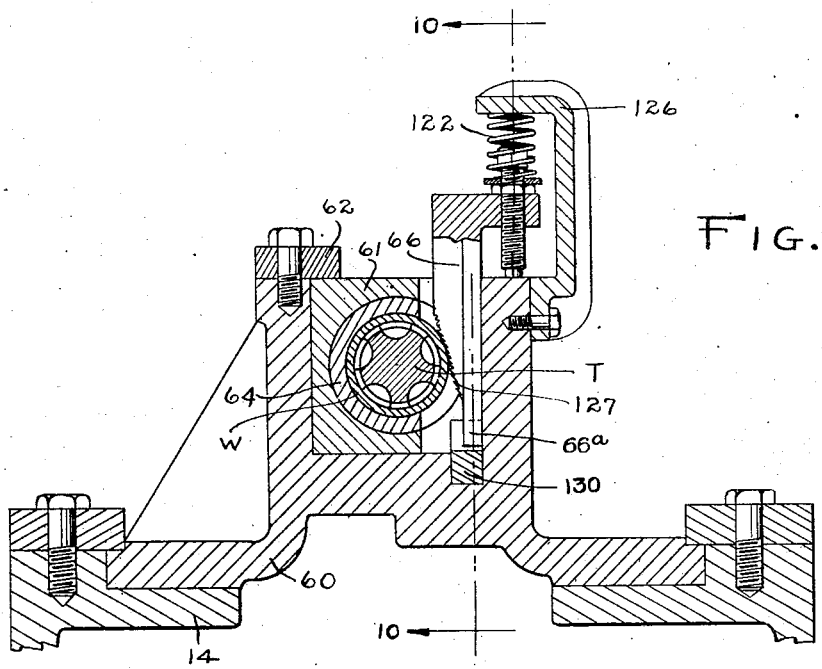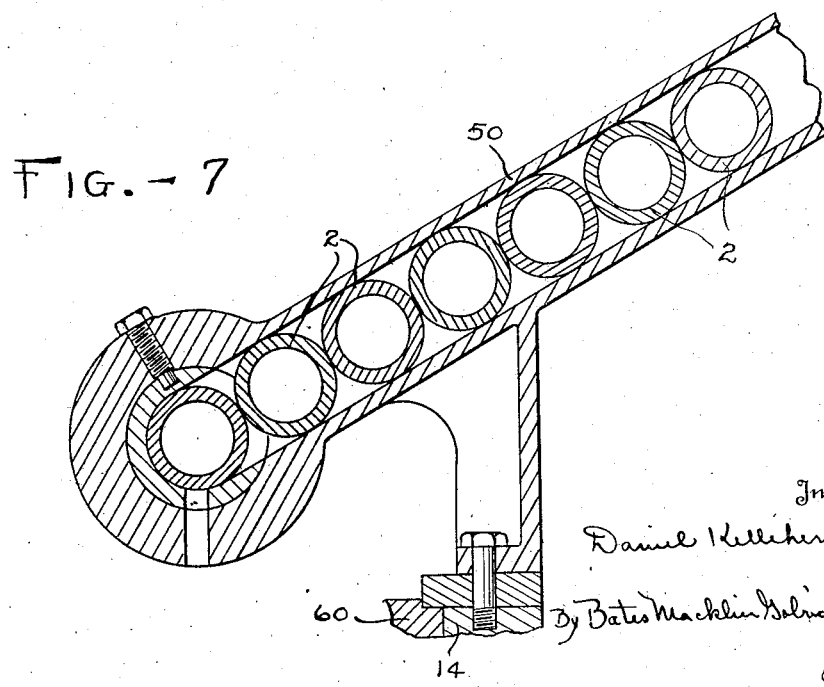

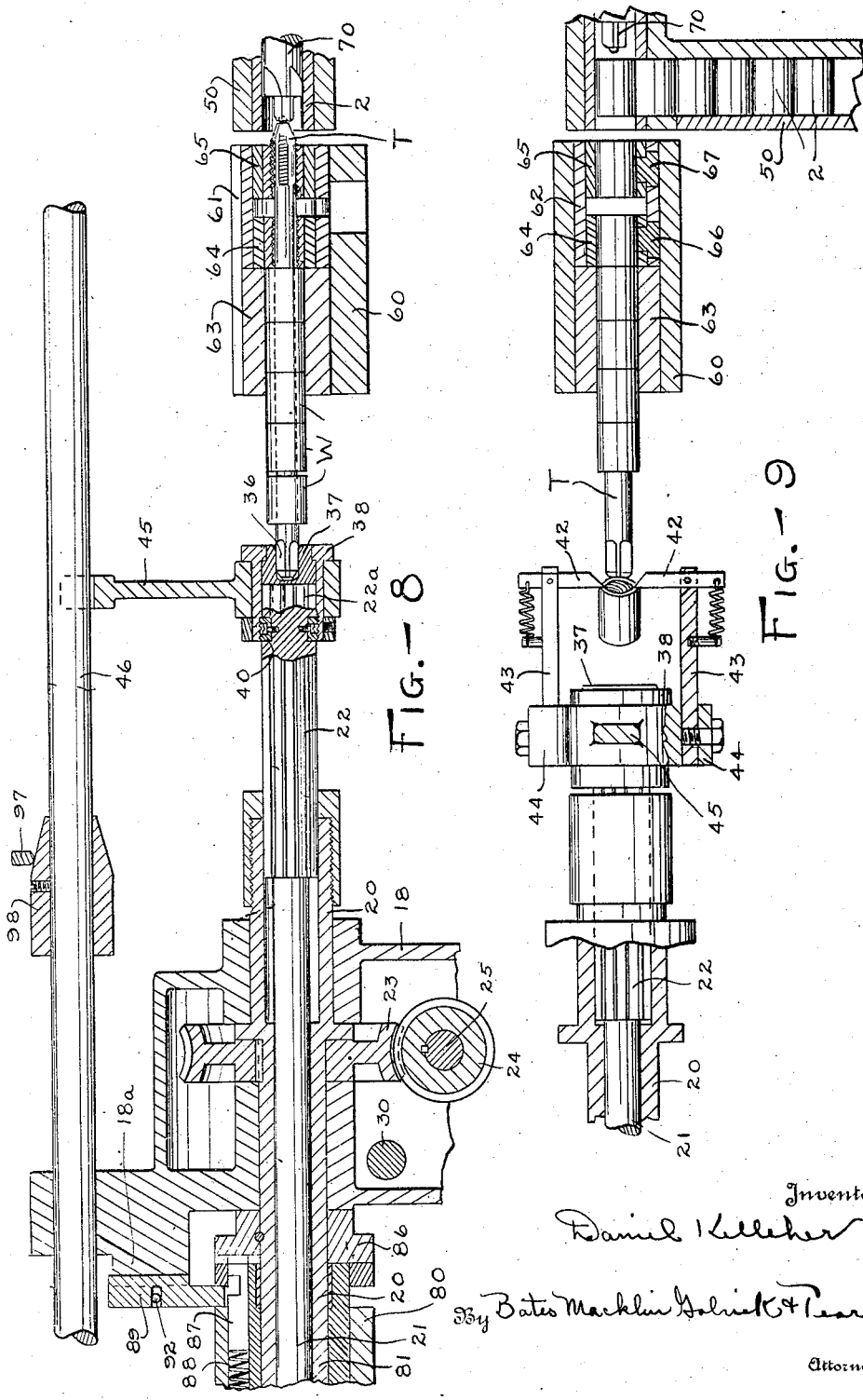

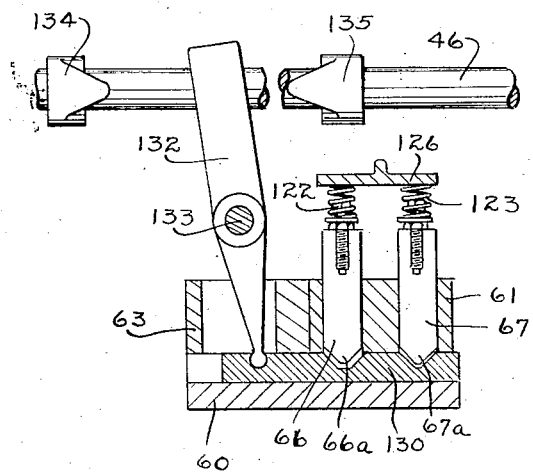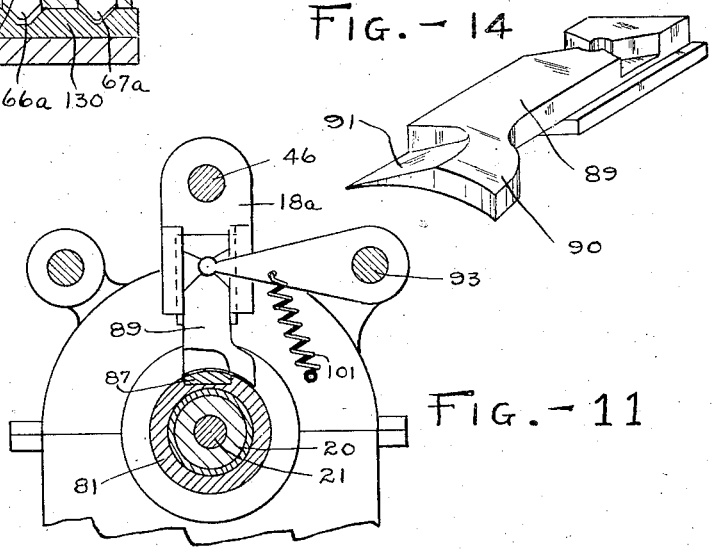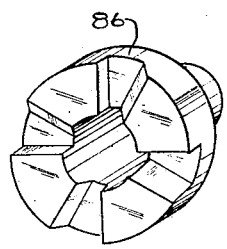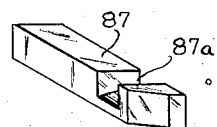

Oct. 11, 1927.                 D. KELLEHER                  1,645,285
                        CONDUIT THREADING MACHINE
                          Filed Aug. 23, 1926          8 Sheets-Sheet 8
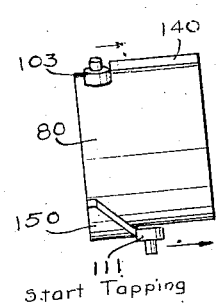
FIG.-15
Start Tapping
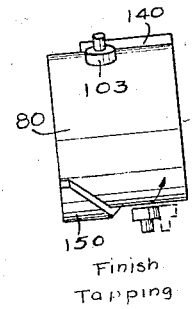
FIG.-16
Finish Tapping
FIG.-17
Start to Strip
FIG.-18
Stripping, Withdrawing feed bar and gripper fingers
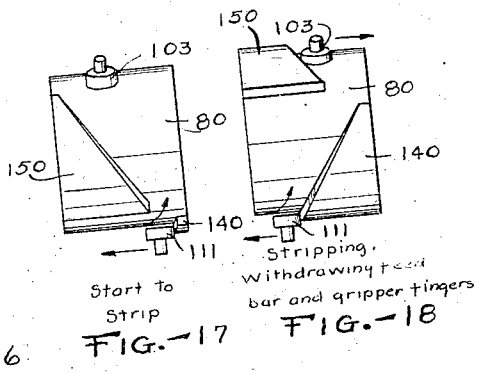
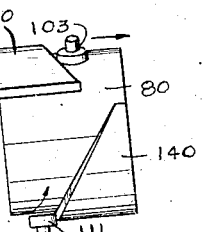
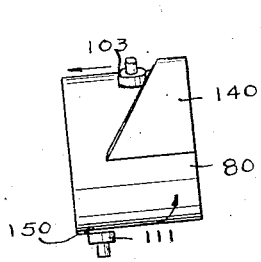
FIG.-19
Feeding and Gripping
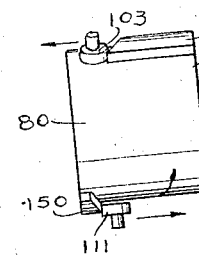
FIG.-20
Completing feed and Driving chuck to tap.
FIG.-22
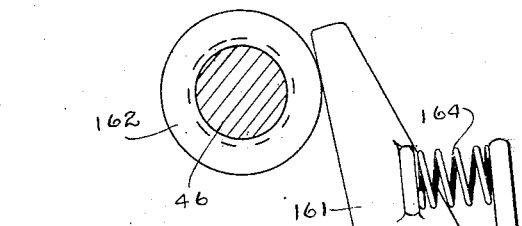
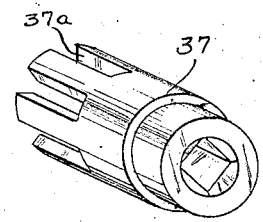
FIG.-23
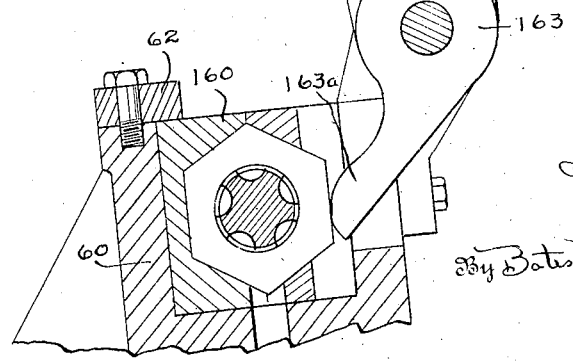
Inventor
Daniel Kelleher
By Bates, Macklin, Gabrick & Teare
Attorneys Patented Oct. 11, 1927.

1,645,285

UNITED STATES PATENT OFFICE.

DANIEL KELLEHER, OF BEREA, OHIO, ASSIGNOR TO THE FOOTE-BURT COMPANY, OF CLEVELAND, OHIO, A CORPORATION OF OHIO.

CONDUIT-THREADING MACHINE.

Application filed August 23, 1926. Serial No. 130,789.

This invention is concerned with thread forming machines and more particularly to tapping machines, and the general object thereof is the provision of a continuously operating non-reversing automatic machine for effecting the formation of non-tapered threads on the articles to be threaded.

A further object of my invention is the provision of a machine of the character referred to which is adaptable to the use of a novel method of feeding the threading tool or tap to the work to be tapped, by utilizing a previously threaded piece of work as a lead or feed screw for the tap.

A further object of my invention is the provision of a tapping machine which will be automatically operated to advance the tap through the pieces of work as the pieces are automatically fed to the machine without necessitating a reversing movement of the tap.

A further object of my invention is the provision of a tapping machine adapted to grip and release the work automatically while the tap is intermittently advanced through the work at a high cutting speed while preventing distortion of the work as it is held by the machine during the thread cutting operation of the tap.

A further object of my invention is the provision of a novel mechanism for intermittently engaging and disengaging the tap and for positioning and gripping the work during the threading action of the tap and for removing the work from the tap after it has been threaded thereby.

A further object of my invention is to provide an automatic tapping machine wherein the time of the functioning of the respective mechanisms comprising the machine is controlled by an advancing movement of the tap.

Other objects of my invention will hereinafter become apparent from the following description which refers to the accompanying drawings illustrating a preferred embodiment thereof. The essential characteristics of my invention are summarized in the claims.

Figure 2:
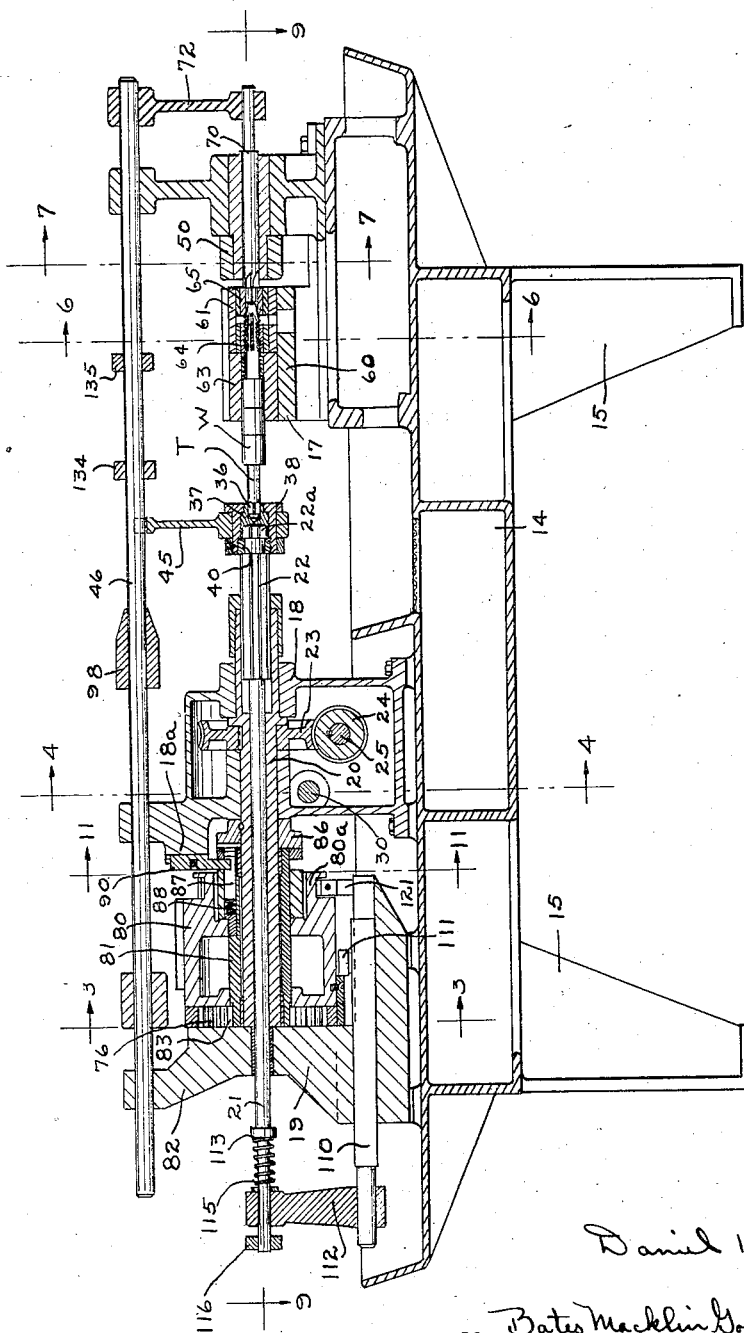
Figure 3:
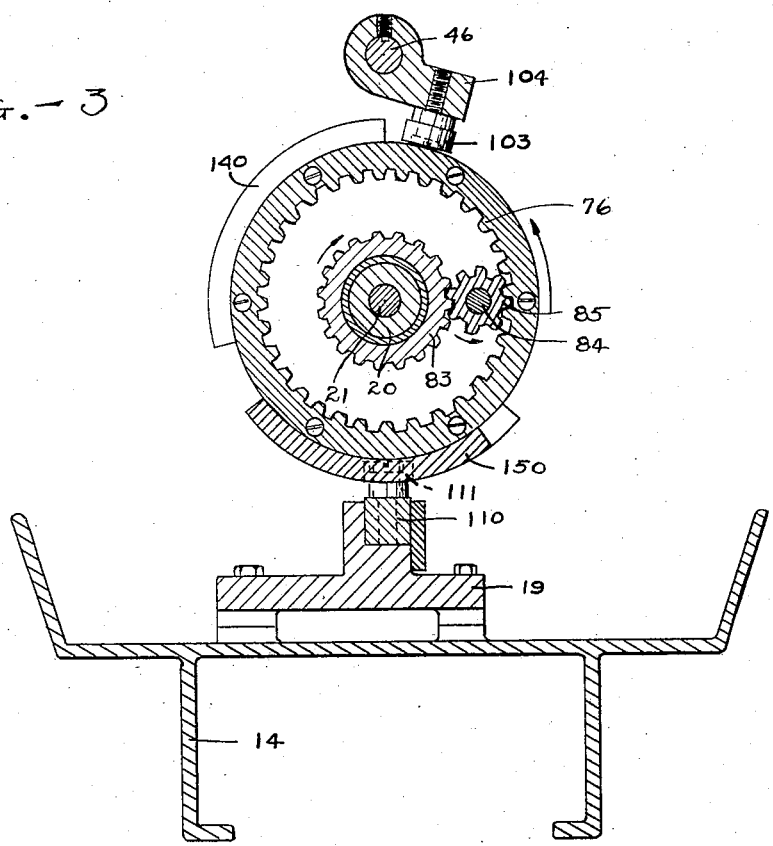
Figure 21:
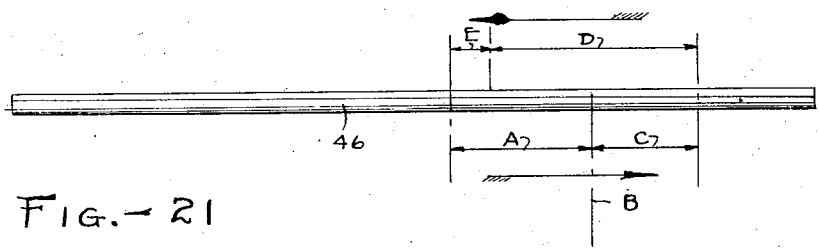
Figure 4:
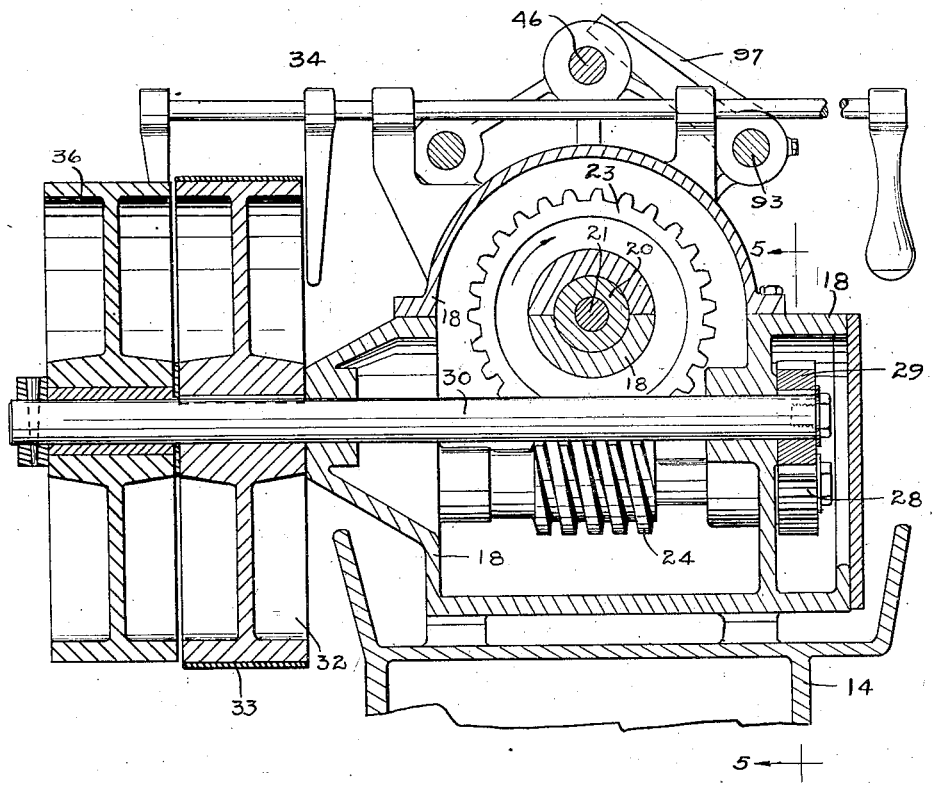
Figure 5:
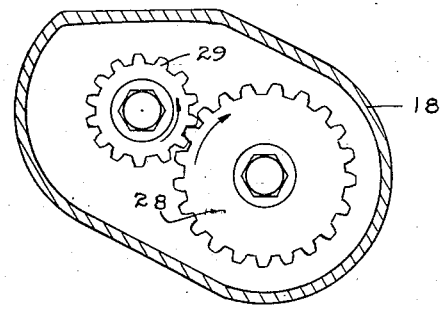

In the drawings Fig. 1 is a side elevation of an automatic threading or tapping machine embodying the features of my invention, and adapted to the threading of conduit couplings; Fig. 2 is a cross sectional side elevation taken through a plane passing through the longitudinal center of the machine; Fig. 3 is a transverse cross sectional view taken through the machine substantially along the line 3—3 of Fig. 2; Fig. 4 is a view similar to Fig. 3 but taken along the line 4—4 of Fig. 2; Fig. 5 is a cross sectional detail view taken along the line 5—5 of Fig. 4; Fig. 6 is an enlarged cross sectional detail of the chuck or work holding apparatus of the machine and taken along the line 6—6 of Fig. 2; Fig. 7 is a cross sectional detail of the work race or magazine taken along substantially the line 7—7 of Fig. 2; Fig. 8 is an enlarged cross sectional view taken through the tap driving means or spindle of the machine; Fig. 9 is a fragmentary horizontal sectional view taken through the spindle head of the machine substantially along the line 9—9 of Fig. 2, but showing the tap disengaged from the spindle of the machine; Fig. 10 is a cross sectional view taken through the work holding means or chuck of the machine substantially along the line 10—10 of Fig. 6; Fig. 11 is a fragmentary cross sectional view taken through the spindle head of the machine along the line 11—11 of Fig. 2; Fig. 12 is a perspective detail view of a clutching member carried by the spindle of the machine; Fig. 13 is a perspective detail of a clutch member which cooperates with the member shown in Fig. 12; Fig. 14 is a perspective view of a clutch camming member; Figs. 15 to 20 inclusive are diagrammatic representations of the camming actions of the machine; Fig. 21 is a diagrammatic representation of the movement of a control rod comprising one of the important features of the present embodiment of my invention; Fig. 22 is a perspective detail of a socket member and Fig. 23 is a modified form of work holding means.

The development of automatic tapping machines and particularly automatic tapping machines directed to threading the work by a continuous rotation of the tapping member has followed practically speaking, four general courses, namely machines where the tap passes completely through the work, and the work is released from the tap, by a double jawed chuck which engages the tap stem or shank at two different places alternately to permit the work to escape from the tap shank; machines wherein a bent or goose neck shank is provided on the tap whereby rotation is imparted to the tap by reason of its bent shape and the tap floats on the threaded work as the work escapes from the machine by passing through the tap rotating means or spindle; machines where the tap is alternately gripped at opposite ends; and machines wherein the spindle is completely disengaged from the tap as the tap remains in engagement with work being threaded while other of the threaded work is stripped from or permitted to escape from the tap shank.

It is with the last named group of machines that my present invention is concerned and I embody in a completely automatic machine, mechanism for rotating the tap, other mechanism for gripping some of the work being threaded or already threaded by the tap, which will cause the tap to advance into the work to be threaded and I combine with these mechanisms, groups of elements operated in timed relation for intermittently rotating the tap and for gripping and releasing the work in an effective manner without causing any distortion of the work during the threading action of the tap. These mechanisms are embodied in a machine in co-ordinated functional relationship in such manner as to require only a minimum number of parts which may be accurately and economically manufactured, and the times of functioning of the various mechanism comprising the machine, is controlled by an advancing movement of the tap. In other words the machine functions automatically after the tap has made a certain number of predetermined cutting revolutions through the work being threaded and the point of application of the mechanical force for initiating the cycle of operations of the mechanisms which re-position the tap for the beginning of a new threading operation, is at the forward end of the tap.

In Fig. 1 of the drawings, I show such a machine for threading conduit couplings as comprising a base or lubricant retaining pan 14, mounted on standards or legs 15. The pan 14 is suitably formed to support at one end thereof a chucking or work holding mechanism generally indicated at 17, for holding the work when being tapped, and a spindle head 18 and a bearing frame 19 which supports a camming mechanism to be hereinafter described.

The spindle mechanism for rotating the tap may comprise a spindle sleeve 20 (see Fig. 2) rotatably mounted in the spindle head or frame 18 and this sleeve carries a longitudinally shiftable tap engaging member 22, the latter being splined to the forward end of the spindle sleeve whereby it may be rotated by the spindle sleeve. The spindle carries a worm wheel 23 which is keyed thereto and the worm wheel is driven by a worm 24 mounted on a transversely extending shaft 25, (see Figs. 2 and 4) the latter being provided with a suitable bearing support comprising a part of the spindle head 18. Mounted on one end of the shaft 25 is a gear 28 (see Figs. 4 and 5) which is driven by a pinion 29 carried on an end of a transversely extending pulley shaft 30. The shaft 30 may be driven by any suitable means such as a pulley 32 and a belt 33. A suitable belt shifting mechanism, as shown at 34, may be provided, if desired, for shifting the belt 33 to a loose pulley 36 when it is desired to stop the machine. The tap engaging member 22 is shifted during certain periods of the cycle of operations of the machine to engage and disengage a squared end 36 formed on the shank of the tap T, and no tap engaging means is provided on this member other than a socket member 37 removably secured to the end of the member 22, whereby socket members of various sizes corresponding to the sizes of the taps being used, may be carried by the tap engaging member 22. One of the socket members 37 is shown in perspective in Fig. 22 and is provided with slots 37ᵃ to engage the splined end 22ᵃ of the member 22. A retaining member 38 is provided to hold the socket member 37 in engagement with the splined end of the member 22 and the member 38 is held in position on the member 22 by a split collar 40 which fits a groove formed in the splined end of the member 22.

The member 22 is positively advanced to engage the shank and also positively retracted from the tap shank to free the end of the tap shank by a camming mechanism hereinafter described in detail, whereby one piece of the work W may be removed from the tap shank during each cycle of operations of the member 22, and the mechanism for positively shifting the member 22 relative to the spindle 20 and the tap, is associated with the spindle to be driven thereby in a novel manner, as will be described. When the member 22 is shifted rearwardly, the tap with work W thereon, is retained by the work supporting or gripping mechanism and one of the pieces of work W is removed from the tap shank by fingers 42 carried by supporting arms 43 supported on a collar 44, non-rotatably carried by the tap engaging end of the member 22. The collar may be prevented from rotation by providing an upwardly extending arm 45 which bears freely on a control rod member 46 as will be fully described.

The work W may be fed to the work holding means 17, through a race or magazine 50, which extends downwardly so that the end thereof aligns with the tap at which position a longitudinal bore is formed therein in alignment with the axis of the tap (see Figs. 7 and 9) so that the work may pass to the work holding means.

The work holding means may comprise a vice or stationary chucking frame 60 adjustably mounted on the bed or pan of the machine frame and suitably formed to support a removable block 61 which is held in the desired position by a bolted strap 62. There is a second similarly formed block 63 which is provided with a bore corresponding to the outside shape or diameter of the work to be tapped and in the present instance the bore corresponds to the outside diameter of the conduits W plus a slight clearance whereby the work may freely pass along the shank of the tap T. The blocks 61 are bored to revolubly support bushing members 64 and 65 and work wedging members 66 and 67 serve to grip two pieces of work during each cycle of operations of the machine. The threads of the tap I have arranged in sufficient length to extend through one piece of work as shown in Figs. 2 and 8 whereby one piece of work will always remain in engagement with some of the threads on the tap at the completion of one cycle of tapping operations of the machine. The tap, after having completed this thread cutting action, and with the piece of work still in engagement with some of the tap threads, is returned to an initial starting position by a plunger member 70 acting indirectly on the tap when it feeds a new piece of work to the tap from the bottom of the race 50. In other words when the member 70 is moved toward the spindle of the machine it thrusts a new piece of work into the bushing 65 and in doing so, the new piece of work shifts the tap toward the spindle of the machine, thus causing the piece of work previously threaded by the tap to be positioned in the bushing 64. The plunger 70 during a certain part of the cycle of operations of the machine is operated by the rod 46 through a connecting arm 72. The rod 46 also serves to operate the work wedging or work gripping members 66 and 67 and its complete functioning will now be described.

Rotatably mounted upon the tap rotating spindle 20 is a camming mechanism which effects the operation of the control rod 46 and the intermittent operation of the camming mechanism is determined by an advancing movement of the tap. This camming mechanism is also utilized for operating a slide mechanism which longitudinally actuates the tap engaging member 22. The spindle is constantly driven through the driving means hereinbefore described and the camming mechanism is intermittently driven by the spindle through a clutch mechanism operated by the rod 46 when the latter is moved by the tap and a brake mechanism serves to arrest movement of the camming mechanism when the lutch is disengaged from the tap spindle.

Before describing in detail the elements comprising the camming mechanism, reference will be made to diagrammatic representation of the activity of the rod 46 as shown in Fig. 21. Assume that the initial movement of the cycle of operations in the control rod 46 is from the left to the right. The movement of the control rod 46, as represented by the distance "A," is effected by the advancing movement of the tap which moves the feed plunger 70 outwardly and this movement of the feed rod is transmitted through the arm 72 (see Fig. 2) to the control rod 46 when the tap extends through the work being threaded, to the position shown in Fig. 8. A clutch mechanism (not yet described) effects the coupling of the tap spindle to the cam mechanism. There is a period of rest "B" in the control rod 46 while the cam mechanism operates to retract the tap engaging member 22 from the tap, and in this action one piece of work is stripped or removed from the tap shank as shown in Fig. 9. As the camming mechanism continues in its movement, the control rod is shifted by the camming mechanism through a distance represented by C, (see Fig. 21) and during this movement the feed plunger 70 is shifted outwardly by the camming mechanism to permit a new piece of work to drop out of the magazine raceway 50 into alignment with the tap axis, and the control rod, through mechanism to be described, unlocks the work engaging chuck, during the outward movement of the feed plunger 70. Continued operation of the camming mechanism then reverses the movement of the rod 46 from right to left, as represented by distance D, thus causing the feed plunger 70 to thrust a piece of work into a position to be engaged by the bushing 65 and gripping wedge 67 and the feed plunger also shifts the tap with a piece of work thereon in engagement with some of the tap threads, to tap starting position. A piece of work on the tap is thus positioned in the bushing 64 to be engaged by the jaws 66 of the work holding means or chuck. During the period D of the movement of the control rod 46, the tap engaging member 22 is advanced to its tap engaging position, and the gripper members 66 and 67 through action of the rod 46 are permitted to engage the two pieces of work now positioned in the work holding means. A final movement represented by the distance E of the diagram shown in Fig. 21, takes place after the work gripping members 66 and 67 have been allowed to engage the work. The nature of their engagement with the work is such however, that the further longitudinal shifting of the work by the rod 46 and the plunger 70 after the members 66 and 67 engage is practical as will be hereinafter fully set forth.

With the foregoing cycle of co-related movements of the tap, the tap engaging member 22 and the control rod 46 presented, the camming mechanism, the clutch control and the work holding means control will now be described in detail.

The camming mechanism of the present machine is embodied in a novel manner, whereby only a minimum number of cooperating parts is required and I prefer to mount this camming mechanism in coaxial alignment with the tap spindle. As shown in Fig. 2 this mechanism may comprise a cam barrel 80 which is mounted on a clutch sleeve 81 rotatably mounted on an extension of the tap spindle sleeve 20 and a suitable frame member 82 is provided to properly support the extension of the spindle sleeve and the camming mechanism. The cam barrel sleeve 81 comprises a gear, as shown at 83, and the gear 83 engages a pinion 84 mounted on a fixed stud 85 carried by the machine frame member 82. The pinion 85 engages and drives an internal gear member 76 secured to one end of the cam barrel 80 and the gear ratio is such that there is a two to one reduction between the sleeve 81 and the cam barrel 80.

A clutch, operated by control rod 46 is provided for drivingly connecting the tap spindle 20 to the cam barrel sleeve 81 as follows: Fixed to the spindle sleeve 20 is a dental clutch member 86 shown in perspective in Fig. 12. The latter member is engaged by a detent member or clutch plunger 87 (shown in perspective in Fig. 13). The plunger member 87 is carried in a slot formed in the cam barrel sleeve 81 and extending parallel with the sleeve axis. A spring member 88 tends to normally urge the plunger member 87 into engagement with the dental clutch member 86 to drivingly couple the spindle sleeve 20 to the cam barrel sleeve 81 but a slidable plunger camming member 89 in the nature of a slide member operatively positioned in a suitable slideway formed to extend on a portion 18$^a$ of the spindle head, maintains the clutch plunger in disengaging position during the threading movement of the tap. The member 89 is shown in perspective in Fig. 14, and the lower end 90 thereof is provided with a camming surface 91 which extends into a slot 87$^a$ (see Fig. 13) of the clutch plunger 87 to withdraw the plunger out of engagement with clutch member 86 to terminate the rotation of the cam barrel sleeve 81.

The clutch camming member 89 is raised by an arm 92 mounted upon a small rocker shaft 93 disposed along the upper part of the machine in parallel relation with control rod 46 (see Fig. 1) and the rock shaft 93 has fixed thereon an arm 97 the free end of which engages a conically shaped member 98 fixed to the control rod 46 whereby when the control rod 46 is shifted to the right by the advancing movement of the tap, the arm 97 is raised and accordingly the arm 92 (see Fig. 2) is raised, thus causing the member 89 to be retracted from the slot of the plunger 87, whereupon the plunger is snapped into engagement with the teeth of the member 86 by the spring 88 and the tap spindle thus drives the cam barrel through the gear train hereinbefore described. When the control rod 46 is shifted to the left, thus shifting the coniform member 98 out of engagement with the arm 97, a spring member 101 (see Fig. 11) causes the clutch camming member 89 to drop down into the rotating path of the clutch plunger 87 and as the plunger engages the camming surface 91, of the member 89, the cam barrel is operatively disengaged from the tap spindle.

The rod 46, as stated, is first actuated by an advancing movement of the tap from left to right but only to the point where the conical member 98 effects the operation of the clutch to drivingly connect the tap spindle to the cam barrel. The further movement of the rod 46 from left to right is completed by cams mounted on the barrel to alternately engage roller 103 (see Fig. 1) carried by an arm 104 secured to the rod 46.

When this is being returned from right to left by the camming mechanism to feed work out of the magazine race and to return the tap to starting position, the tap engaging member 22 is moved positively, by the camming mechanism described, to the point of engaging the tap shank. The camming mechanism is then brought to rest as described. Thereafter, a spring member urges the member 22 against the tap and until the tap shank is in the socket of the socket member 37 and during the subsequent advancing movement of the tap caused by the feed or lead screw action of the threaded work retained by the gripping member 66, the transmission of torque from the tap engaging member 22 to the tap causes the member 22 to follow the tap shank while remaining in driving engagement therewith.

The positive actuation of the member 22 to the tap engaging position is effected through a slide member 110 operatively mounted on a frame member 82. The slide member 110 accordingly has mounted thereon, a roller 111, properly disposed relative to the cam barrel to be engaged by the cams mounted thereon. The slide member 110 extends at one end of the frame to afford engagement with an arm 112 extending upwardly to slidably engage the outer end of the tap member 22 and interposed between the arm 112 and a collar 113 mounted on the tap engaging member 22, is a spring member 115, which, when not being acted upon by the arm 112 is retained in a partly compressed condition by a collar 116 secured to the projecting end 21 of the tap engaging member 22. Thus, when the tap engaging member 22 is being dragged by the tap, the collar 116 (see Figs. 1 and 2) is in engagement with the arm 112. A brake mechanism for arresting the movement of the cam barrel 80 after it is operatively disengaged from the tap spindle, may comprise an expansible band 120 which extends around a reduced portion 80ª of the cam barrel and is supported by member 121 mounted on the machine frame. The brake band 120 is adjusted to constantly exert sufficient friction on the bar when being driven by the tap rotating spindle so that the cam barrel immediately comes to rest when the spindle is drivingly detached from the cam barrel, but if desired an intermittent braking action may be obtained by suitable braking mechanism operated by the movement of the slide member 110.

With the foregoing described mechanism in mind, a description of the means for operating the work gripping or wedging members 66 and 67 will now be readily understood, and, as shown in Figs. 6, 9 and 10, the wedging or work gripping members 66 and 67 are normally urged downwardly into engagement with the work by spring members 122 and 123 which react between the top surfaces of the wedging members and upwardly extending bracket member 126 secured to the work supporting frame member 60. The members 66 and 67 have the wedging surfaces thereof provided with saw teeth 127 after the fashion of a pipe wrench jaw to bite into the work when torsion is applied thereto consequent to the threading action of the tap. The members 66 and 67 are shifted upwardly out of the work engaging position by a cam slide 130 positioned in a slot formed in the frame member 60 to engage the bottom tapered ends 66ª and 67ª of the members 66 and 67 respectively and the cam slide 103 is provided with properly proportioned notches whereby the work gripping member 67 will engage the piece of work the threads of which have just been completed by the tap, slightly before the gripping of the new piece of work by the member 66. Thus the coupling which is to act as the lead screw for the tap will take the torsion reaction of the tap rotation first.

The cam slide 130 may be operated by an arm 132 pivotally supported as shown at 133 on the frame member 60. The upper end of the arm 132 is disposed to be swung to the right and to the left by members 134 and 135 rigidly secured to the control rod 46 at such positions that the work will be released at the termination of the shifting of the movement of the rod to the extreme right and the work will be gripped at the termination of the movement of the rod to the extreme left. It will be seen that the nature of the work engaging members is such that the work can be shifted longitudinally a slight amount during the terminating movement of the rod 46 to the extreme left and after the members 66 and 67 have come into gripping engagement with the work but just as soon as torque is applied to the tap the teeth 127 of the respective work gripping members will immediately become effective to prevent rotation of the work. By providing the bushings 64 and 65 the work can revolve slightly while being carried by the bushings and thus become firmly gripped by the members 66 and 67 without any circumferential distortion of the work taking place. This is an important detail directed to the successful operation of my machine in that the tap member may be rotated at maximum cutting speed and danger of breaking the tap is thus practically eliminated. Having thus described in detail the various coordinated mechanism embodied in the present form of my invention, a brief description of the cams incorporated in the camming mechanism will disclose that I effect the operation of a number of the mechanisms by the use of only two cams mounted on the cam barrel 80, and reference will now be made to the diagrammatic representation of the camming actions as disclosed in Figs. 15 to 20 inclusive.

In Fig. 15 a cam 140 and a cam 150 are shown as being respectively reverse in form and positioned in spaced apart relation on the cam barrel. It may be assumed for the moment that the beginning of the cycle of operations of the machine will find the cam barrel with the cams in the position shown in Fig. 15. The tap, in order to begin the operation of the machine has been manually provided with a piece of work in engagement with the threads thereof and a piece of work to be tapped is inserted in the work holding means along with the piece of work in engagement with the tap threads to position the tap as shown in Fig. 8. The belt 33 is shifted by the belt shifting mechanism 34 to drive pulley 32 and the tap spindle rotates the tap engaging member 22. The cam barrel as shown in Fig. 15 remains stationary. The spring 115 urges the member 22 into engagement with the tap shank by reason of the position of the roller 111. After the spindle rotates the tap, the member 22 follows the tap through the action of the spring 115 until the collar 116 engages the arm 112 (see Fig. 2) and thereafter the tap drags the member 22 and slide 110 along with it in its advancing movement due to torsional strain between the tap shank and the socket 37 of the member 22, thus the roller 111 is moved to the right as shown in Fig. 16. The tap causes the rod 46 to operate the clutching mechanism as hereinbefore described during the completion of its advancing movement. Thus the cam barrel is rotated but the remainder of the lead on the cam 150 does not function on the roller 111 inasmuch as the roller 111 has been moved to the right out of the path of the cam 150 except the last part thereof which causes compression of spring 115 due to the work being still gripped by the work gripping means which has not been acted on as yet by the rod 46. As the cam barrel revolves further, the cam 140 engages the roll 111 to shift the tap engaging member 22 to the left out of engagement with the tap and while doing so causes the stripped fingers 42 to remove one piece of work from the tap as shown in Fig. 9. As the cam barrel thus rotates, the cam 150 reaches the roll 103, shifts the roll 103 to the extreme right, thus causing the feed plunger 70, through operation of the rod 46, to be shifted out of the end of the magazine race, thus permitting a new piece of work to drop into alignment with the tap. The completion of the movement of the roll 103 by the cam 150 effects the release of the work held by the work holding means through operation of the rod 46 in the manner hereinbefore described. The continued movement of the cam barrel then causes the cam 140 to engage the roll 103 and shift it to the left as shown in Fig. 19, thus causing the feed plunger 70 to insert new work in the work holding means and to thereby shift the tap to an intermediate starting position. A continued rotation of the cam barrel then causes the cam 150 to engage the roll 111 and causes the tap engaging member 22 to be advanced to engaging position with the tap shank and to also actuate the slide 110 to further compress the spring 115 as shown in Fig. 2. In the meantime the cam 140 will have completed a shift of the rod 46 to the extreme left, thus disengaging the clutch and locking the work. In the meantime the spindle has been continuously rotated, the cam barrel is brought to rest by the brake mechanism and the spring 115 completes the engagement of the socket of the tap engaging member 22 with the tap shank. This complete cycle of operations has been effected during only two revolutions of the tap spindle.

In Fig. 23 I show a modified form of work holding means for tapping hexagonal nuts. For this form of work holding means, blocks 160 are provided to receive the work in the manner described but a special form of gripper means is provided comprising an arm 161 operated by a member 162 secured to the control rod 46. Work engaging fingers 163 are coaxially mounted on a pivotal support for the arm 161 and a resilient means such as spring members 164 are interposed between the fingers and the arm 161. The lower ends of the fingers 163ª engage flat surfaces of the nuts and in all other respects the machine functions in the manner hereinbefore described.

From the foregoing description of my invention it will be seen that I provide a group of coordinated mechanisms for effecting the automatic tapping of articles wherein it is desired to cut a straight thread and which will function at a high rate of speed without decreasing the normal cutting life of the tap. The initiation of the actuation of the various mechanisms for repositioning the tap, for stripping the threaded work from the tap and from feeding work to the tap is controlled entirely by the advancing movement of the tap. The entire cycle of operations for repositioning the tap to starting position takes only two revolutions of the tap spindle and since the tap is driven at maximum cutting speed practically 90% of the total time the machine is operating is devoted productively to actual cutting of threads. The operating parts are simple and few in number and of such shape and character as to be economically manufactured in an accurate manner. The machine is adaptable not only to the particular application of threading conduits, but also to the tapping of nuts, T's, etc. it being only necessary to alter the character of the work supporting bushings comprising part of the work holding means to hold work of various shapes. Furthermore, it will be apparent that in the event the magazine rest becomes empty of work to be threaded, no work will remain in engagement with the threads on the tap after two cycles of operation and the mechanisms comprising the machine other than the tap spindle drive will remain at rest.

It is to be understood that the novel arrangement of camming mechanism hereinbefore disclosed is adaptable to use in automatic metal working machinery, not necessarily concerned with effecting the formation of threads and which adaptations I would consider to be within the scope of my invention as set forth in the claims.

I claim:

1. A tapping machine wherein the tap may float longitudinally while being rotated, and means for holding a piece of work on the threads of the tap against rotation and longitudinal movement, whereby the held piece may advance the tap into another piece of work as the tap is rotated.

2. In a tapping machine, a longitudinally movable tap, means intermittently engaging it to rotate it, and gripping means for holding two pieces of work in substantially constant relation to each other, one piece operating as a lead screw to feed the tap to the other.

3. In a machine of the character described, the combination of a tap, a rotating means therefor, a work gripping means adapted to grip more than one piece of the work being operated upon by the machine whereby one of the pieces of work may act as a lead screw on the tap to effect the feeding of the tap to the other piece of work while the tap is being rotated by said rotating means, and means controlled by the advancing movement of the tap for operating the work gripping means.

4. In a machine of the character described, the combination of tap, a rotating means therefor, a work gripping means adapted to grip more than one piece of the work being operated upon by the machine whereby one of the pieces of work may act as a lead screw on the tap to effect the feeding of the tap to the work while the tap is rotated by said rotating means, and means controlled by the advancing movement of the tap for feeding in work to be threaded to the gripping means.

5. In a machine of the character described, the combination of a tap, a rotating means therefor, a work gripping means adapted to grip a piece of work being operated upon by the machine and hold such piece against longitudinal movement, and means controlled by the movement of the tap relative to such held piece for feeding unthreaded work to the gripping means.

6. In a tapping machine, a longitudinally floating tap, means for driving it, means for feeding a blank to a temporary fixed position for tapping, said means being actuated by the movement of the tap while threading a positioned blank.

7. In a tapping machine, a frame, a longitudinally movable tap, means for holding a piece of work in substantially fixed relation to the frame while being tapped, and means actuated consequent upon a predetermined movement of the tap with relation to the work for feeding a new piece of work to the holding means.

8. In a tapping machine a frame, a tap and means for rotating it, means for holding a piece of work in substantially fixed relation to the frame while engaged by the tap threads whereby the work advances the tap, and means arranged to become active to feed a new piece of work to the holding means when the tap is so advanced to a predetermined position relative to the frame.

9. In a threading machine, the combination of a tap, a spindle, a splined member carried by the spindle for driving the tap, and means for shifting the splined member longitudinally relative to the tap, said means including a resilient member for urging the splined member into engagement with the tap shank after the splined member has been shifted by said means.

10. In a threading machine, the combination of a tap, a spindle mechanism for driving the tap, means for shifting part of the spindle mechanism longitudinally relative to the tap, said means including a rotatable camming means and a resilient member for urging the shiftable part of the spindle mechanism into engagement with the tap shank.

11. In a tapping machine adapted for tapping cylindrical pieces of work, the combination of a tap, means for rotating the tap, means for gripping the work to be tapped, and means for effecting a relative longitudinal movement between the tap and tap rotating means, said gripping means including a work gripping member acting on the work periodically and tangentially relative to the rotating movement of the tap.

12. In a tapping machine, the combination of a tap, means for rotating the tap, means for gripping the work to be tapped and means for effecting a relative longitudinal movement between the tap and tap rotating means, said gripping means including a work gripping member movable to engage and disengage the work and acting periodically to wedge the work in the direction of rotation of the tap.

13. In a tapping machine, the combination of a tap, means for rotating the tap, means for gripping the work to be tapped, means for effecting a relative longitudinal movement between the tap and tap rotating means, said gripping means including a work gripping member movable transverse to the tap axis to engage the work and arranged to permit longitudinal shifting of the work when in work gripping position.

14. In a tapping machine, the combination of a tap, means for rotating the tap, means for gripping the work to be tapped, means for effecting a relative longitudinal movement between the tap and tap rotating means and a mechanism for feeding the work to the gripping means, said mechanism being operable by the advancing movement of the tap and including means for operating the gripping means.

15. In a tapping machine, a tap, means for rotating the tap, means for effecting relative longitudinal movement between the tap and said tap rotating means, means for gripping the work, means for shifting the tap toward the tap rotating means while the work is engaged with the tap, said work gripping means tending to grip the work upon a rotatable movement thereof while permitting longitudinal movement of the tap with the work thereon after said gripping means has been set to the work gripping position.

16. In a tapping machine, a tap, means for rotating the tap, means for effecting relative longitudinal movement between the tap and said tap rotating means, means for gripping the work, means for shifting the tap toward the tap rotating means, while the tap is engaged with the tap, said work gripping means tending to grip the work upon a rotatable movement thereof, and means automatically controlled by the advancing movement of the tap for operating the gripping means.

17. In a tapping machine, a tap, means for rotatably supporting the tap, means for effecting relative longitudinal movement between the tap and said tap rotating means, means for gripping the work, means for shifting the tap toward the tap supporting means while the work is engaged therewith and means for feeding work to the tap, said last named means being automatically effective by an advancing movement of the tap to control the operation of all of said foregoing mentioned means.

18. In a tapping machine, a tap, means for rotatably supporting the tap, means for effecting longitudinal movement between the tap and said tap supporting means, means for gripping the work, and means controlled by an advancing movement of the tap for effecting the operation of the last two mentioned means.

19. In a threading machine, a tap, a driving spindle therefor, means for driving the spindle, longitudinally shiftable means driven by the spindle and engaging the tap, a camming mechanism acting on said last mentioned means and rotatable on the spindle and means for drivingly connecting the spindle to said camming means intermittently.

20. In a threading machine, a tap, a driving spindle therefor, means for driving the spindle, longitudinally shiftable means driven by the spindle and engaging the tap, a camming mechanism acting on said last mentioned means and a resilient member operatively interposed between the camming mechanism and the shiftable means and rotatable on the spindle, and a clutch means for drivingly connecting the spindle to said camming means.

21. In a threading machine, a tap, a driving spindle therefor, means for driving the spindle, longitudinally shiftable means driven by the spindle and engaging the tap, a mechanism carried by said last mentioned means for removing work from the tap shank, a camming mechanism acting on said shiftable means and rotatable on the spindle, and means controlled by a movement of the tap for drivingly connecting the spindle to said camming means.

22. In a threading machine, a tap, a driving spindle therefor, means for driving the spindle, longitudinally shiftable means driven by the spindle and engaging the tap, a camming mechanism acting on said last mentioned means and rotatable on the spindle and means controlled by a movement of the tap for drivingly connecting the spindle to said camming means.

23. In a tapping machine, the combination of a tap, a spindle for driving the tap, a longitudinally shiftable member driven by the spindle and engaging the tap, a cam means concentrically rotatable relative to the spindle for shifting said member, and means drivingly interposed between the spindle and said cam means for rotating the latter at a speed different than the spindle speed.

24. In a tapping machine, the combination of a tap, a spindle mechanism for driving the tap including a longitudinally shiftable member driven by the spindle and engaging the tap, a cam rotating concentrically relative to the spindle for shifting said member, and means drivingly interposed between the spindle and said cam means for rotating the latter in a direction reverse to the direction of rotation of the spindle.

25. In a tapping machine, the combination of a tap, a spindle for driving the tap, a longitudinally shiftable member driven by the spindle and engaging the tap, said member carrying means for removing the threaded work from the tap, a cam rotating concentrically relative to the spindle for shifting said member, means drivingly interposed between the spindle and said cam means for rotating the latter and means operated by an advancing movement of the tap for controlling the driving action of the spindle on said camming means.

26. In a tapping machine, the combination of a tap, a spindle for driving the tap, a longitudinally shiftable member driven by the spindle and engaging the tap, a cam rotating concentrically relative to the spindle for shifting said member, and an internal gear train drivingly interposed between the spindle and said cam means for rotating the latter.

27. In a conduit threading machine, the combination of means for gripping a conduit, a tap, means for rotating the tap, mechanism for shifting the work and the tap longitudinally relative to the tap rotating means, said mechanism including a cam mechanism mounted to rotate on the tap rotating means, and means for drivingly engaging and disengaging the last named mechanism to and from the tap rotating means.

28. In a conduit threading machine, the combination of means for gripping a conduit, a tap, a spindle for rotating the tap, means for shifting the work and the tap longitudinally relative to the spindle, said means including a cam mechanism mounted to rotate on the spindle, means for drivingly engaging and disengaging the last named means to and from the spindle, and a brake mechanism acting on the cam mechanism at a predetermined point of its revolution.

29. In a conduit threading machine, the combination of means for holding a conduit, a tap, a spindle for rotating the tap, means for shifting the work and the tap longitudinally relative to the spindle, said means including a cam mechanism mounted to rotate on the spindle, means for drivingly engaging and disengaging the last named means to and from the spindle and means acted on by the tap for initiating the driving engagement of the spindle with the cam mechanism.

30. In a conduit threading machine, the combination of means for holding a conduit, a tap, a spindle for rotating the tap and means for shifting the work and the tap longitudinally relative to the spindle, said means including a cam mechanism mounted to rotate on the spindle and the initiation of the movement of which is controlled by the relative position of the tap and the conduit holding means.

31. In an automatic tapping machine, the combination of a tap, mechanism for rotating the tap, mechanism for holding a given piece of work while it is being tapped, means for disengaging the tap rotating mechanism from the tap shank while said work holding mechanism retains the work and tap, mechanism for shifting the work and tap toward the tap rotating mechanism, mechanism engaging the same piece of work to hold it and the tap in the new position whereby this piece of work may serve as a lead screw for the tap in tapping a new piece of work, and mechanism for moving the tap rotating mechanism toward the tap shank.

32. In an automatic tapping machine, the combination of a tap, mechanism for rotating the tap, mechanism for holding two pieces of work while one is being tapped, whereby one piece acts as a lead screw for feeding the tap to the other, means for disengaging the tap rotating mechanism from the tap shank while said work holding mechanism retains the work and tap, members actuated by said means for removing work from the tap shank, mechanism for shifting the tap and work toward the tap rotating mechanism to move the last tapped piece to the other holding position, mechanism for moving the tap rotating mechanism toward the tap shank.

33. In an automatic tapping machine, the combination of a tap, mechanism for rotating the tap, mechanism for holding the work while it is being tapped, means for shifting the tap rotating mechanism away from the tap shank while said work holding mechanism retains the work and tap, mechanism for shifting the tap and work toward the tap rotating mechanism, and mechanism for moving the tap rotating mechanism toward the tap shank including a resilient member for urging the rotating mechanism and tap shank into engagement.

34. In an automatic tapping machine, the combination of a tap, mechanism for rotating the tap, mechanism for holding the work while it is being tapped, mechanism for shifting the tap and work toward the tap rotating mechanism and mechanism for moving the tap rotating mechanism toward the tap shank including a spring member for urging engagement of the rotating mechanism with the tap shank.

35. In a conduit tapping machine, the combination of a tap, a spindle for rotating the tap, a work gripping means operative to retain the tap and work and thereby cause separation of the tap and spindle, mechanism for shifting the spindle away from the tap shank, mechanism for subsequently shifting the tap and work toward the spindle and mechanism for shifting the spindle toward the tap shank after the tap and its work have been shifted, and resilient means for causing a subsequent engagement of the tap shank and spindle.

36. In a conduit tapping machine, the combination of a tap, a spindle for rotating the tap, a work gripping means operative to retain the tap and permit separation of the tap and spindle mechanism for shifting the spindle away from the tap shank, means actuated by the spindle shifting mechanism for removing work from the tap shank, mechanism for subsequently shifting the tap and work toward the spindle and mechanism for shifting the spindle toward the tap shank after the tap and its work have been shifted.

37. In a conduit tapping machine, the combination of a tap, a spindle for rotating the tap, a work gripping means operative to retain the tap and permit separation of the tap and spindle mechanism for shifting the spindle away from the tap shank, cam mechanism serving to subsequently shift the tap and work toward the spindle and to shift the spindle toward the tap shank after the tap and its work have been shifted.

38. In a conduit tapping machine, the combination of a spindle for rotating the tap, a work gripping means operative to retain the tap and permit separation of the tap and spindle mechanism for shifting the spindle away from the tap shank, mechanism for subsequently shifting the tap and work toward the spindle mechanism for shifting the spindle toward the tap shank after the tap and its work has been shifted and means controlled by movement of the tap for initiating the operations of said mechanisms.

39. In a conduit tapping machine, the combination of a tap, a spindle for rotating the tap, a work gripping means operative to retain the tap and permit separation of the tap and spindle, mechanism for subsequently shifting the tap and work toward the spindle and mechanism for shifting the spindle toward the tap shank after the tap and its work has been shifted, the last two named mechanisms being operated by the spindle.

40. In a machine of the character described, a combination of a spindle, a tap, independently movable means rotated by the spindle for engaging the tap, non-rotatable means carried by said movable means for removing the work from the tap shank, means for holding work to be threaded by the tap and for suspending the tap while engaged with the work and a camming mechanism mounted on the spindle for actuating said independently movable means.

41. In a conduit tapping machine, the combination of a tap, a spindle for rotating the tap, a work gripping means, mechanism for shifting the tap and work toward the spindle and mechanism for shifting the spindle toward the tap shank after the tap and its work has been shifted, said mechanisms being operated by the spindle.

42. In a machine of the character described, the combination of a spindle, a tap, independently movable means rotated by the spindle for engaging the tap, a cam mechanism acting on said means, a clutch for drivingly connecting the spindle to the camming mechanism and mechanism controlled by the movement of the tap for actuating the clutch mechanism.

43. In a machine of the character described, the combination of a tap, a spindle, a member splined to the spindle to be longitudinally shiftable relative thereto, said member having a socket formed in the end thereof for engaging the shank end of the tap, means carried adjacent the tap engaging end of said member for removing work from the end of the tap shank when said member is disengaged from the tap by a longitudinal movement thereof, means for rotating the spindle, means intermittently driven by the spindle for effecting the longitudinal movement of said member, said last named means being operative to become automatically disengaged from the driving action of the spindle.

44. In a machine of the character described, the combination of a tap, a spindle, a member splined to the spindle to be longitudinally shiftable relative thereto, said member having a socket formed in the end thereof for engaging the shank end of the tap, means carried adjacent the tap engaging end of said member for removing work from the end of the tap shank when said member is disengaged from the tap by a longitudinal movement thereof, means intermittently driven by the spindle for effecting the longitudinal movement of said member, said last named means being operative to become automatically disengaged from the driving action of the spindle and a brake mechanism operative to arrest the movement of said means when it is drivingly disconnected from the spindle.

45. In a machine of the character described, the combination of a tap, a spindle, a member splined to the spindle to be longitudinally shiftable relative thereto said member having a socket formed in the end thereof for engaging the shank end of the tap, means carried adjacent the tap engaging end of said member for removing work from the end of the tap shank when said member is disengaged from the tap by a longitudinal movement thereof, means acting on said spring to cause the tap to fit the socket of said member and means intermittently driven by the spindle for effecting the longitudinal movement of said member by acting on said spring, said last named means being operative to become automatically disengaged from the driving action of the spindle.

46. In a tapping machine, the combination of a tap, a spindle for rotating the tap, including a member slidable to be dis-connected from the tap, a work holding means, means for automatically feeding the work to the work holding means and for shifting the tap to initial tapping position, means for shifting the tap engaging member, said tap shifting means including mechanism for operating the last named means and also operative upon an advancing movement of the tap to initiate the operation of the means which shifts the tap engaging member.

47. In a tapping machine, the combination of a tap, a spindle for rotating the tap including a slidable tap engaging member, a work holding means, means for automatically feeding the work to the work holding means and for shifting the tap to initial tapping position, means for shifting the tap engaging member independently of the tap shifting movement, said tap shifting means being operative upon an advancing movement of the tap to initiate the operation of the means which shifts to tap engaging member.

48. In a tapping machine, the combination of a tap, a spindle for rotating the tap, including a slidable tap engaging member, a work holding means, and means for automatically feeding the work to the work holding means and for shifting the tap said last named means being also operative to operate the work holding means.

49. In a tapping machine of the character described, the combination of a spindle, a tap, a member rotated by the spindle and movable relative thereof, means for moving said member, said means being driven by the spindle through an intermittently operated clutch and means actuated by an advancing movement of the tap to cause the spindle and said means to be respectively connected in driving and driven relation.

50. In a tapping machine of the character described, the combination of a spindle, a tap, a member rotated by the spindle and movable relative thereto, means for moving said member, an intermittently operated clutch for operatively connecting said spindle and means, and means actuated by an advancing movement of the tap to cause the spindle and said means to be operatively connected.

51. In a tapping machine of the character described, the combination of a spindle, a tap, a member rotated by the spindle, and movable relative thereto, means for moving said member, said means being driven by the spindle through an intermittently operated clutch and non-rotating means carried by said member for removing work from the tap shank.

52. In a tapping machine, a spindle, a member rotated by the spindle and longitudinally movable relative thereto, a tap engaged by said member, intermittently operated means for shifting said member longitudinally of the spindle including a resilient member for urging the end of said member into engagement with the end of the tap after said member has been longitudinally shifted by said means.

53. In a tapping machine, a spindle, a member rotated by the spindle and longitudinally movable relative thereto, a tap engaged by said member, intermittently operated means for shifting said member in two directions longitudinally of the spindle including a resilient means for urging the end of said member into engagement with the end of the tap after said member has been longitudinally shifted by said means.

54. In a tapping machine, a spindle, a member rotated by the spindle and longitudinally movable relative thereto, a tap engaged by said member, intermittently operated means driven by the spindle for shifting said member longitudinally of the spindle including a resilient means for urging the end of said member into engagement with the end of the tap after said member has been longitudinally shifted by said means, said means thereafter permitting said member to follow the tap.

55. In a tapping machine, a tap, means for rotating the tap, means for holding work to be threaded by the tap, said means being adaptable to engage a piece of work previously threaded by the tap and hold it against longitudinal movement whereby said work may act as a lead screw for the tap to cause the tap to thread other work when rotated.

56. In a tapping machine, a tap, means for rotating the tap, means movable tangentially to engage the work to be threaded by the tap, said means being adaptable to engage a piece of work previously threaded by the tap whereby said work may act as a lead screw for the tap to cause the tap to thread other work when rotated.

57. In a tapping machine, a tap, and means for rotating the tap, means tangentially wedging work to be threaded by the tap to thereby hold it, said wedging being consequent upon initiating the rotation of the tap.

58. In a tapping machine, a tap, mechanisms for longitudinally shifting the tap in two directions, means for gripping the work to be threaded by the tap, and means automatically operated by an advancing movement of the tap for initiating the actuation of said mechanisms.

59. In a tapping machine, a tap, mechanisms for longitudinally shifting the tap in two directions, means for gripping the work to be threaded by the tap one of said mechanisms serving to operate the work gripping means and means automatically operated by an advancing movement of the tap for initiating the actuation of said mechanisms.

60. In a tapping machine, a tap, mechanisms for longitudinally shifting the tap in two directions, means for gripping the work to be threaded by the tap and means operated by one of said mechanisms for operating the gripping means.

61. In a tapping machine, the combination of a tap, including a shiftable tap engaging member, means for gripping the work to be tapped and for retaining the tap with the work thereon when said member is disengaged from the tap, means mounted on said member for removing threaded work from the tap shank, a camming mechanism carried by the spindle and intermittently driven by the spindle, means extending from the camming mechanism to the work gripping means for feeding new work to the tap, and a clutch interposed between the spindle and the cam mechanism, said last named means being adapted to be acted upon by the tap to operate the clutch.

62. In a tapping machine, the combination of a tap including a shiftable tap engaging member, means for gripping the work to be tapped and for retaining the tap with the work thereon when said member is disengaged from the tap, non-rotatable means mounted on said member for removing threaded work from the tap shank, a camming mechanism carried by the spindle and intermittently driven by the spindle, means extending from the camming mechanism to the work gripping means for feeding new work to the tap, a clutch interposed between the spindle and the cam mechanism, said last named means being adapted to be acted upon by the tap to operate the clutch and a gear train drivingly interposed between the clutch mechanism and the camming mechanism.

63. In a tapping machine, the combination of a tap including a shiftable tap engaging member, means for gripping the work to be tapped and for retaining the tap with the work thereon when said member is disengaged from the tap, a camming mechanism carried by the spindle and intermittently driven by the spindle, means extending from the camming mechanism to the work gripping means for feeding new work to the tap, a clutch and a gear train drivingly interposed between the spindle and the cam mechanism.

64. In a tapping machine, the combination of a spindle, camming mechanism mounted on the spindle, a clutch for connecting the spindle to the camming mechanism, a tap engaging member carried by the spindle and movable longitudinally relative thereto, a slide mechanism disposed beneath the spindle and actuated by the camming mechanism for operating said longitudinally shiftable member, a work supporting means for holding the work while being tapped, means extending from the camming mechanism to the work supporting means for operating the clutch when acted on by the tap, the camming mechanism operating on said means to reposition the tap to starting position, and camming mechanism including a pair of cams which alternately operate the means acting on the longitudinally shifting member and the means acting on the work holding means.

65. In a tapping machine, the combination of a spindle, camming mechanism mounted on the spindle, a tap engaging member carried by the spindle and movable longitudinally relative thereto, a slide mechanism actuated by the camming mechanism for operating said longitudinally shiftable member, a work supporting means for holding the work while being tapped, means extending from the camming mechanism to the work supporting means for operating the latter, the camming mechanism operating on said last named means to reposition the tap to starting position and the camming mechanism including a pair of cams which alternately operate on the means acting on the longitudinally shifting member and the means acting on the work holding means.

66. In a tapping machine, the combination of a spindle, camming mechanism mounted on the spindle a tap engaging member carried by the spindle and movable longitudinally relative thereto, a slide mechanism actuated by the camming mechanism for operating said longitudinally shiftable member, and means extending from the camming mechanism to the work supporting means, for repositioning the tap to starting position, said camming mechanism including a pair of cams which alternately operate the means acting on the longitudinally shifting member and the tap repositioning means.

67. In a machine of the character described, a tap, a spindle, a member carried by the spindle for engaging the tap, a cam barrel mounted on the spindle, a sleeve rotatably interposed between the cam barrel and the spindle comprising a gear, a planetary gear carried by the cam barrel for engaging an internal gear on the cam barrel for actuating the tap engaging member and a brake mechanism acting on the cam barrel to intermittently arrest movement of the cam barrel.

68. In a machine of the character described, a tap, a tap rotating spindle, a cam barrel mounted on the spindle, a sleeve rotatably interposed between the cam barrel and the spindle comprising a gear, a planetary gear carried by the cam barrel for engaging an internal gear on the cam barrel, a clutch for operatively connecting the spindle and sleeve, means operated by a cam on the cam barrel for actuating the tap engaging member and means operated by said cam for operating the clutch.

69. In a machine of the character described, a tap, a tap rotating spindle, a cam barrel mounted on the spindle, means drivingly connecting the spindle to the cam barrel, means operated by a cam on the cam barrel for actuating the tap engaging member and a brake mechanism acting on the cam barrel to intermittently arrest its movement.

70. In a machine of the character described, the combination of a spindle, a tap and a longitudinal shiftable member rotated by the spindle, said member having an open socket for engaging the tap shank and means for holding two pieces of work with one piece in engagement with the tap threads whereby it may act as a feed screw for the tap, said shiftable member being adapted to follow the tap shank through torsional reaction.

71. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool and means for intermittently operatively connecting said rotation means to the camming mechanism.

72. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool, a clutch mechanism for connecting the camming mechanism to the rotation means, and means for operating the clutch mechanism and controlled by said relative longitudinal movement effected between the work and tool.

73. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool and a clutch mechanism intermittently operated by the camming mechanism.

74. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool, means for intermittently operatively connecting said rotation means to the camming mechanism, said last named means being controlled by said relatively movement between the work and tool.

75. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool, means for intermittently operatively connecting said rotation means to the camming mechanism and means for automatically removing work from the work holding means.

76. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool, a clutch mechanism for connecting the camming mechanism to the rotation means, means for operating the clutch mechanism and controlled by said relative longitudinal movement effected between the work and tool, and means for automatically removing the work from the work holding means.

77. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool, a clutch mechanism for connecting the camming mechanism to the rotation means, means for operating the clutch mechanism and controlled by said relative longitudinal movement effected between the work and tool, means for automatically removing work from the work holding means and other means for automatically feeding new work to the tool.

78. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool, a clutch mechanism for connecting the camming mechanism to the rotation means and means for operating the clutch mechanism and controlled by said relative longitudinal movement effected between the work and tool.

79. In a machine of the character described, the combination of a spindle, a tap rotated by the spindle, and means for holding two pieces of work with one piece in engagement with the tap threads whereby it may act as a feed screw for the tap, said means including revoluble bushings and work wedging members.

80. In a machine of the character described, the combination of a spindle, a tap rotated by the spindle, and means for holding two pieces of work with one piece in engagement with the tap threads whereby it may act as a feed screw for the tap, said means including wedge shaped work engaging members, the operation of which is controlled by an advancing movement of the tap.

81. In a tapping machine means for holding a piece of work, a tap movable longitudinally relative to the work to thread it, means for driving the tap, and mechanism drivingly connected therewith to feed new pieces of work into threading position, said mechanism being actuated only when the tap has advanced to a predetermined position relative to a piece being threaded whereby if there are no pieces to be fed the feeding mechanism becomes idle.

82. In a tapping machine, a tap, means for driving the tap, a magazine for blanks, means for feeding blanks to the tap into tapping position, said last named means becoming active only when the tap is in a predetermined position with relation to a blank being threaded, whereby when the magazine is empty the feeding means is subsequently rendered inactive.

In testimony whereof, I hereunto affix my signature.

DANIEL KELLEHER.

DISCLAIMER 1,645,285.—*Daniel Kelleher*, Berea, Ohio. CONDUIT-THREADING MACHINE. Patent dated October 11, 1927. Disclaimer filed March 26, 1932, by the patentee, the assignee, *The Foote-Burt Company*, consenting.

Your petitioner therefore hereby enters this disclaimer as to claims 1, 58, 59, 60, 71, 72, 73, 74, 75, 76, 77, and 78 in said patent, which are in the following words, to wit:

"1. A tapping machine wherein the tap may float longitudinally while being rotated, and means for holding a piece of work on the threads of the tap against rotation and longitudinal movement, whereby the held piece may advance the tap into another piece of work as the tap is rotated."

"58. In a tapping machine, a tap, mechanisms for longitudinally shifting the tap in two directions, means for gripping the work to be threaded by the tap, and means automatically operated by an advancing movement of the tap for initiating the actuation of said mechanisms.

"59. In a tapping machine, a tap, mechanisms for longitudinally shifting the tap in two directions, means for gripping the work to be threaded by the tap one of said mechanisms serving to operate the work gripping means and means automatically operated by an advancing movement of the tap for initiating the actuation of said mechanisms.

"60. In a tapping machine, a tap, mechanisms for longitudinally shifting the tap in two directions, means for gripping the work to be threaded by the tap and means operated by one of said mechanisms for operating the gripping means."

"71. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool and means for intermittently operatively connecting said rotation means to the camming mechanism.

"72. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool, a clutch mechanism for connecting the camming mechanism to the rotation means, and means for operating the clutch mechanism and controlled by said relative longitudinal movement effected between the work and tool.

"73. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool and a clutch mechanism intermittently operated by the camming mechanism.

"74. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool, means for intermittently operatively connecting said rotation means to the camming mechanism, said last named means being controlled by said relative movement between the work and tool.

"75. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool, means for intermittently operatively connecting said rotation means to the camming mechanism and means for automatically removing work from the work holding means.

"76. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool, a clutch mechanism for connecting the camming mechanism to the rotation means, means for operating the clutch mechanism and controlled by said relative longitudinal movement effected between the work and tool, and means for automatically removing the work from the work holding means.

"77. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool, a clutch mechanism for connecting the camming mechanism to the rotation means, means for operating the clutch mechanism and controlled by said relative longitudinal movement effected between the work and tool, means for automatically removing work from the work holding means and other means for automatically feeding new work to the tool.

"78. In a metal cutting machine the combination of a cutting tool, means for holding work to be operated upon by said tool, means for effecting relative rotation between the work holding means and said tool, a camming mechanism coaxially arranged relative to said means for effecting a relative longitudinal movement between the work and tool, a clutch mechanism for connecting the camming mechanism to the rotation means and means for operating the clutch mechanism and controlled by said relative longitudinal movement effected between the work and tool."

[Official Gazette April 19, 1932]